United States Patent Office 3,386,247
Patented June 4, 1968

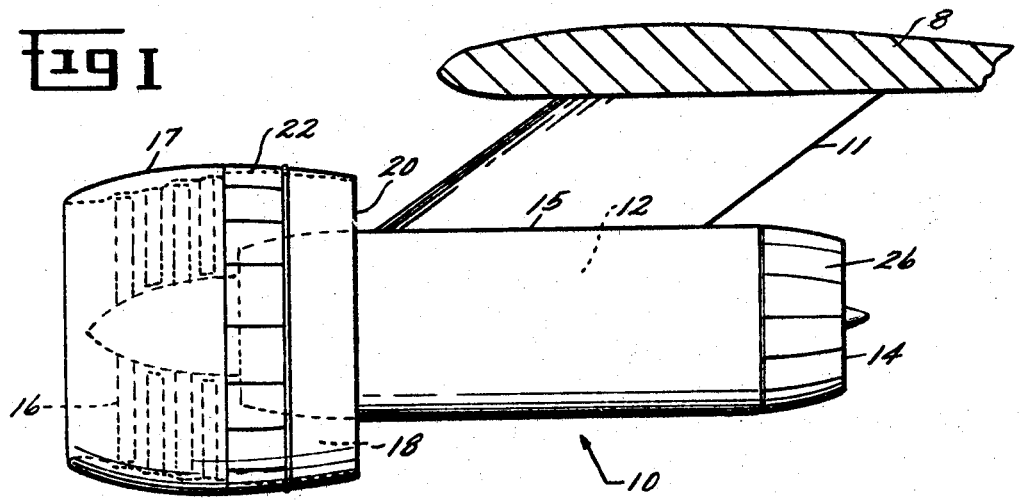
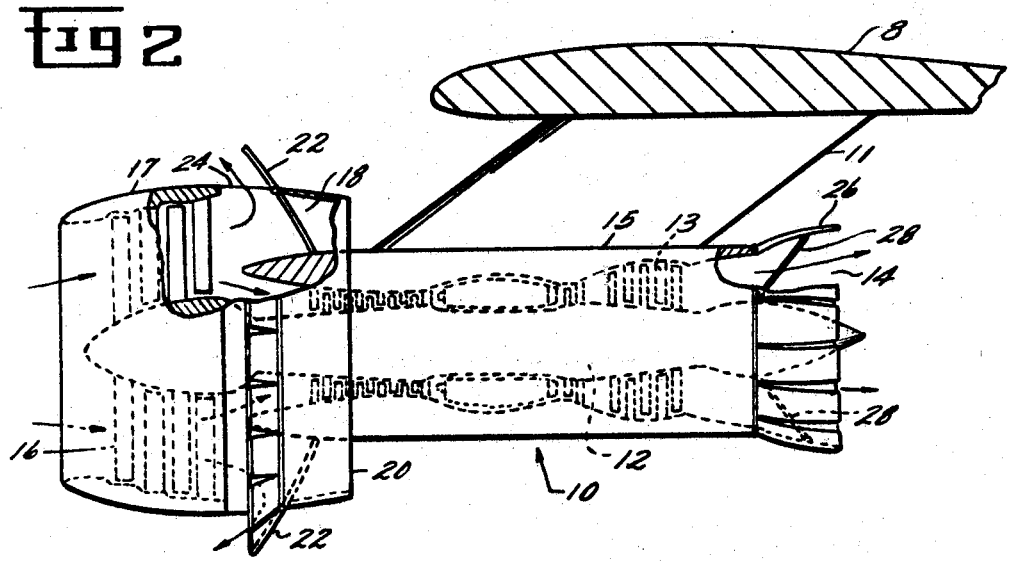

3,386,247
POWERPLANT WITH THRUST REVERSER
Charles H. Gross, Lebanon, and Augustus M. Helmintoller, Loveland, Ohio, assignors to General Electric Company, a corporation of New York
Filed Sept. 9, 1966, Ser. No. 578,380
8 Claims. (Cl. 60—226)

ABSTRACT OF THE DISCLOSURE

The invention is directed to a fan jet powerplant with thrust reversing means in the cowling for the fan stream. A thrust spoiling means is used at the exit of the primary inner jet so that spoiling the primary stream increases the pressure ratio across the fan to overspeed it and increase its reverse thrust.

---

With the advent of the fan engine, whether forward or aft fan, it has become necessary to supply reverser mechanism to reverse the fluid flow through the generally annular cross-section of the bypass duct. Because the use of fans with conventional jet engines results in larger diameter engines, it is desired to provide reverser mechanism that does not add appreciably to an already large diameter when in the reversing position. Furthermore, because the engines become large and the reversing operation must be carried out on a relatively large periphery, it becomes important that the reversing structure be lightweight and straightforward and simple in operation. Such reversers generally employ translating or sliding structures such as doors, cams, and complex linkages in order to open the reverser and to slide flaps or doors into position for thrust reversal and then move the same structure out of position during cruise operation. It is preferable, if possible, to use the structure that is already present in the engine and make it operate as a reverser as well as part of the normal engine structure during cruise operation. Typically, reverser structures of this type are shown in U.S. Patents 3,262,268, 3,262,270, 3,262,271. Another type is shown in co-pending application Ser. No. 462,792, filed June 7, 1965, now U.S. Patent 3,279,182, all being of common assignment. These devices all show front fan engines with an outer cowling forming a bypass duct with an inner jet engine and thrust reversal means operated in conjunction with the cowling to reverse the bypass flow. In such engines, the amount of flow reversing obtainable is generally sufficient and the inner gas generator or jet engine discharges its thrust without any reversal although reversal of the primary stream may be provided if necessary. However, the primary exhaust gas stream is generally of small enough thrust that sufficient reversal is obtained without reversing it.

The primary object of the present invention is to provide a powerplant of the turbofan type with thrust reversal capabilities greater than that normally obtainable by reversing the fan flow.

Another object is to provide such a powerplant with thrust reversing capabilities of the reversed flow at high efficiency.

A further object is to provide such a powerplant which operates to increase the pressure ratio across the fan turbine and overspeed the fan to increase the fan flow when reverse thrust is desired.

Briefly stated, the invention is directed to a jet propulsion powerplant of the fan type which has an inner turbojet engine with a primary nozzle for thrust. An inner wall encloses the engine and is surrounded by a cowling spaced from the wall to form a bypass duct. A fan concentric with and driven by the turbine of the engine, preferably by a connection thereto, is disposed to extend radially beyond the wall into the duct to pump a large mass flow through the duct. Preferably, the inner wall extends downstream of the cowling so that the cowling and inner wall form another nozzle for the duct flow. In this powerplant there is provided means separate from the nozzle and upstream of the nozzle connected to block the total flow through the duct and direct it forward for reverse thrust. This may conveniently be by a flap arrangement which rotates from the cowling or inner wall and turns the duct flow through an opening in the cowling for reverse thrust. There is provided means on the primary nozzle that is operative to spoil the primary thrust by increasing the primary nozzle area. Spoiling the primary thrust increases the pressure ratio across the fan turbine whose speed is thereby increased to increase the fan speed and mass flow to increase the reverse thrust.

While the specification concludes with claims particularly pointing out and distinctly claiming the subject matter which is regarded as the invention, it is believed the invention will be better understood from the following description taken in connection with the accompanying drawings in which:

FIG. 1 is a partial cross-sectional view of a typical front fan powerplant supported from an aircraft wing and employing the instant invention;

FIG. 2 is a diagrammatic view illustrating the overall powerplant and means to spoil the primary thrust and change the pressure ratio across the turbine engine increasing the reverse thrust.

Referring first to FIG. 1, there is shown a front fan powerplant of the general type that might employ the instant invention. To this end, aircraft structure such as wing 8 may support an engine powerplant generally indicated 10 by means of conventional pylon structure 11. Engine 10 may conveniently be of the front fan type as shown although it is not limited to a front fan. Engine or powerplant 10 is of the type employing an inner turbojet engine 12 with turbine 13 driving fan 16 and the engine exhaust discharging through a nozzle 14 to provide thrust. The term jet engine herein is intended to be of the type employing a turbine 13 to drive the engine compressor and/or fan 16. The nozzle may be fixed or variable area employing flaps or slidable plug, as is well-known. Engine 10 is enclosed within an inner wall 15 in the conventional manner. In order to provide additional thrust, a front fan 16 concentric with and connected to be driven by the engine and extending radially beyond the wall 15 is provided. The fan 16 is surrounded by cowling 17 which is larger in diameter than the engine and is spaced from the engine wall 15 to form a bypass duct 18 for additional thrust by movement of relatively large masses of lower velocity air in a known manner. As shown, the fan propels fluid through duct 18 as well as supercharging engine 12.

In normal operation, depending on the bypass ratio employed, i.e. the ratio of air flowing through duct 18 to the exhaust gases exiting from nozzle 14, reverse thrust may be obtained by reversing the fan air flow in duct 18. Generally, it is advantageous to provide a second nozzle 20 between the cowling and inner wall whereby a short cowling is used for a front fan engine as shown. It will be appreciated that cowling 17 could extend aft of the inner engine and the fan could be a free aft fan as well-known. However, as will be later seen, a desired upstream termination is preferred.

The large mass of air through the fan may be reversed by any suitable means as shown in the aforementioned patents and co-pending application. To illustrate simply, FIG. 2 shows that the reversing structure may consist of blocking flaps 22 that are pivoted to the cowling and rotatable into and across duct 18 to intercept the total fan air separate from and upstream of nozzle 14 and direct it forwardly through opening 24 in cowling 17. Such a peripheral pivoted flap arrangement is shown in detail in the copending application. Because the main propulsive thrust is obtained in the bypass duct 18, it is important that the blocking means block the total flow through the duct since this is the flow of air with the high energy level. In such an engine as thus far described, reverse thrust is obtained by blocking the duct flow and directing it forwardly by blocking flaps 22 and the thrust obtained from the primary nozzle 14, which is a small amount percentagewise, or is permitted to exit uninterrupted.

In order to obtain greater reverse thrust than normally obtained in the powerplant described, primary nozzle 14 is provided completely separate from the blocking means and is equipped with means to spoil the primary thrust. By "spoiling" is meant any means by which the primary flow may exit with a minimum or substantially zero velocity. In other words, there is no substantial thrust obtained from the primary exhaust gases through nozzle 14 when the thrust is spoiled. Generally, thrust spoiling is obtained by opening up the exhaust area wide so that the flow suddenly expands and the velocity is removed. Any suitable means for thrust spoiling may be used such as slots in the nozzle 14, a plug nozzle that is axially movable to increase the area, or more conveniently, by hinged flaps 26 which may then serve a dual purpose by being used in the normal fashion to provide a variable area nozzle but in this instance are used also through suitable mechanism 28 to open outwardly and spoil the thrust from the nozzle. Thus, upstream termination of nozzle 26 is preferred to avoid interference with the flows and with the outwardly opening flaps 26.

As a general example, if it is assumed that thrust from the fan stream through bypass duct 18 is 70% and thrust through the primary nozzle 14 is 30%, it can be seen that the net reverse thrust may be 40%. In other words, if the bypass duct can be completely reversed, the engine would have 70% reverse thrust. However, the primary stream is still providing 30% thrust in the forward direction which must be subtracted from the bypass reverse thrust giving a net 40% reverse thrust. It is, of course, possible to reverse the primary stream to increase this and schemes have been proposed for doing this. However, the spoiling flaps 26 have a major advantage in simplicity and in increased thrust as will now become apparent. It will be clear that if flps 26 are opened outwardly to spoil the thrust, the effect of the 30% thrust of the primary stream on the engine is removed. Thus the engine now obtains 70% reverse thrust merely by the reversal of the bypass duct flow and spoiling the primary flow. However, more importantly, it has been found that spoiling the primary thrust removes a restriction on the engine flow resulting in a lower ambient static pressure on the downstream side of turbine 13 to increase the pressure ratio across the turbine and resulting in an overspeeding of the turbine and the fan 16. Thus, the fan speeds up and pumps more air through the engine. This results in an increase in the reverse thrust obtainable. Then, instead of obtaining 70% reverse thrust, considerably more is obtained merely by spoiling the primary gas stream with this combination. This is a vast improvement over reversal of the primary gas stream and is obtained by much simpler mechanism requiring only an additional linkage to permit the flaps 26 to move outwardly for spoiling in addition to varying the area of the nozzle in the normal fashion.

Thus, the powerplant disclosed provides a highly efficient increased reverse flow by the expedient of spoiling the primary thrust through nozzle 14. A dual advantage is obtained since the spoiling of thrust through nozzle 14 not only subtracts that from the forward velocity but, in addition, changes the pressure ratio across the turbine to speed up the fan and cause it to pump more flow through the engine and thus through the bypass duct and thus increase the reverse thrust out opening 24. By the simple expedient of opening up the flaps 26 or their equivalent, a major advantage is obtained in the major thrust capabilities of such a powerplant with simple mechanism that is already present. This increase is over and above that normally obtained by merely canceling or subtracting the thrust of the primary flow.

While there has been described a preferred form of the invention, obviously modifications and variations are possible in light of the above teachings. It is therefore to be understood that within the scope of the appended calims, the invention may be practiced otherwise than as specifically described.

We claim:
1. A jet propulsion powerplant of the fan type having an inner turbojet engine with a primary nozzle for thrust,
   a wall enclosing said engine,
   a cowling surrounding said wall and spaced therefrom to form a bypass duct,
   a fan concentric with and driven by the turbine of said engine and extending radially beyond said wall into said duct,
   means separate from the nozzle and upstream thereof connected to block the total flow through said duct and direct it forward for reverse thrust, and
   means on said nozzle operative to spoil the primary thrust by increasing the pressure ratio across the turbine to overspeed the fan and increase the reverse thrust.

2. Apparatus as described in claim 1 wherein the blocking means comprises flaps rotatable into said duct and opening means is provided in said cowling for the duct flow.

3. Apparatus as described in claim 1 wherein said fan is connected to and driven by said jet engine.

4. Apparatus as described in claim 1 wherein said spoiling means comprises hinged flaps opening outwardly on said nozzle.

5. Apparatus as described in claim 3 wherein said fan is a front fan and said engine wall extends downstream of said cowling, said cowling forming a nozzle with said wall.

6. Apparatus as described in claim 3 wherein said blocking means comprises flaps pivoted to said cowling and rotatable across said duct, and opening means is provided in said cowling for the duct flow.

7. Apparatus as described in claim 4 wherein said blocking means comprises flaps pivoted to said cowling and rotatable across said duct, and opening means is provided in said cowling for the duct flow.

8. Apparatus as described in claim 5 wherein said blocking means comprises flaps pivoted to said cowling and rotatable across said duct, and opening means is provided in said cowling for the duct flow.

References Cited

UNITED STATES PATENTS

| 2,957,306 | 10/1960 | Attinello | 60—264 |
| 3,024,601 | 3/1962 | Nash | 60—226 |
| 3,068,646 | 12/1962 | Fletcher | 60—226 |
| 3,330,115 | 7/1967 | Markowski | 60—226 |
| 2,694,897 | 11/1954 | Roy. | |
| 3,036,431 | 5/1962 | Vdolek. | |
| 3,048,973 | 8/1962 | Benedict. | |
| 3,057,150 | 10/1962 | Horgan. | |
| 3,167,911 | 2/1965 | Sandre. | |

CARLTON R. CROYLE, *Primary Examiner.*

D. HART, *Assistant Examiner.*